US008100307B2

(12) United States Patent
Chinn et al.

(10) Patent No.: US 8,100,307 B2
(45) Date of Patent: Jan. 24, 2012

(54) OXYGEN BOTTLE CARRIER FOR USE WITH X-FRAME AMBULANCE COTS

(75) Inventors: Bob Chinn, Cumming, GA (US); Earl Choy, Cumming, GA (US)

(73) Assignee: Ferno-Washington, Inc., Wilmington, OH (US)

( * ) Notice: Subject to any disclaimer, the term of this patent is extended or adjusted under 35 U.S.C. 154(b) by 555 days.

(21) Appl. No.: 12/293,584

(22) PCT Filed: Mar. 20, 2007

(86) PCT No.: PCT/US2007/006905

§ 371 (c)(1),
(2), (4) Date: Dec. 15, 2008

(87) PCT Pub. No.: WO2007/109267

PCT Pub. Date: Sep. 27, 2007

(65) Prior Publication Data

US 2010/0230454 A1 Sep. 16, 2010

(51) Int. Cl.
*B60R 11/00* (2006.01)

(52) U.S. Cl. ........... 224/407; 5/658; 211/74; 248/311.2; 248/312; 224/552; 224/554; 224/555; 224/557; 224/926

(58) Field of Classification Search .................. 224/407, 224/552, 553, 554, 571, 926, 555, 557; 211/74
See application file for complete search history.

(56) References Cited

U.S. PATENT DOCUMENTS

| | | | | |
|---|---|---|---|---|
| 1,549,155 | A * | 8/1925 | Schwab et al. | 248/313 |
| 3,304,116 | A * | 2/1967 | Stryker | 296/20 |
| 3,391,891 | A * | 7/1968 | Garden | 248/311.2 |
| 3,427,668 | A * | 2/1969 | McManus, Jr. | 5/503.1 |
| 3,761,968 | A * | 10/1973 | Besler | 5/503.1 |
| 3,971,591 | A * | 7/1976 | Ziaylek | 297/188.04 |
| 4,071,175 | A * | 1/1978 | Wagnon | 224/414 |
| 4,213,648 | A * | 7/1980 | Steichen | 297/188.2 |
| 4,383,528 | A * | 5/1983 | Eppolito | 128/205.22 |
| 4,506,903 | A * | 3/1985 | Bowermaster | 280/304.1 |
| 5,022,105 | A * | 6/1991 | Catoe | 5/11 |
| 5,259,372 | A * | 11/1993 | Gross et al. | 128/200.24 |
| 5,288,001 | A * | 2/1994 | Locarno | 224/407 |
| 5,365,622 | A * | 11/1994 | Schirmer | 5/611 |
| 5,681,080 | A * | 10/1997 | Pond et al. | 297/188.05 |
| 6,883,766 | B1 * | 4/2005 | Ziaylek et al. | 248/313 |
| 6,926,243 | B1 * | 8/2005 | Ziaylek et al. | 248/307 |
| 6,951,328 | B1 * | 10/2005 | Drapeau et al. | 248/315 |
| 2002/0174486 | A1 * | 11/2002 | Heuvel et al. | 5/611 |
| 2007/0267453 | A1 * | 11/2007 | Carroll | 224/407 |
| 2008/0190947 | A1 * | 8/2008 | Bourgraf | 220/737 |

* cited by examiner

*Primary Examiner* — Gary Elkins
(74) *Attorney, Agent, or Firm* — Dinsmore & Shohl LLP

(57) ABSTRACT

A device is disclosed for detachably coupling an oxygen bottle to an ambulance cot such that they are transportable together as a unit. The device fits between a pair of support legs of the cot, and is adjustable to accommodate oxygen bottles of various sizes.

20 Claims, 5 Drawing Sheets

OXYGEN BOTTLE CARRIER FOR USE WITH X-FRAME AMBULANCE COTS

The present invention generally relates to bottle carriers and in particular, to a device for carrying an oxygen bottle in cooperation with a wheeled patient transport device, such as an x-frame ambulance cot.

As is normal during the treatment of an injured patient, it is often necessary to transport a patient in an ambulance cot while the patient is connected to an oxygen bottle. Typically, the oxygen bottle as well as other such life support devices, such as a respirator, a defibrillator, etc., is placed in the bed with the patient. Even under to best conditions this is not suitable since lines become tangled, pinched closed, and disconnected. In the event of an emergency situation, it is absolutely necessary that the emergency personnel and hospital staff have clear and unhindered access to the patient.

It is known to provide a clamping device for direct attachment of "D" size oxygen bottle to an emergency cot side rail, or a fastening device for attaching such bottles to the cot behind the back support. Although, "D" size oxygen bottle have been suitable for their intended purposes, the "E" size oxygen bottle is gaining in favor among emergency response teams due to the extra storage capacity. However, "E" size oxygen bottles are quite cumbersome. In most situations, "E" size oxygen bottles are placed on the cot bed surface between the patient's legs, when the patient is being moved from the transport vehicle into the operating room. This is a dangerous situation. The worst case is the bottle falling off the cot in such a way that the post valve is broken off the bottle turning the cylinder into a missile. Such consequences are catastrophic. A more dangerous situation occurs when the bottle is placed on the bed surface during vehicular transport. Under these circumstances, since unsecured, the bottle may become a missile in a vehicular crash even if the post valve is not broken.

Another method of transporting such an oversized bottle include carting an "E" size oxygen bottle on a separate cart. This method also has it own set of problems. When it necessary to transport a patient while having oxygen available or while administering it to the patient using the "E" size oxygen bottle, an additional person is required for manipulating the cart and maintaining an oxygen line to the patient. This technique has made for unwieldy situations, since hallways, doorways, elevators, etc., are often not suitable for allowing the free passage of the extra attendant and/or the trail-along cart. Also, there is the increased danger of the oxygen line being disconnected since the emergency personnel have to coordinate their efforts so that there is no jerking or pulling of the oxygen line running between the cart mounted bottles and the patient in the ambulance cot.

It is against the above-mentioned background, that the invention provides a simple carrier that is capable of accommodating an "E" sized oxygen tank generally within the lateral boundaries of the ambulance cot without extra attendants. The present invention is designed to complementarily mate with the support legs of an x-frame ambulance cot in such a manner that its weight is distributed along the major axis of the cot avoiding cantilevered loads. Since the oxygen bottle carrier is positioned generally within the lateral boundaries of the ambulance cot itself, the load will be distributed generally vertically down to the wheels and along its major axis. Once loaded, the line from the oxygen bottle is extended and connected to the patient in an orderly, safe and tangle-free manner.

The present invention also eliminates the possibility of broken regulators from oxygen cylinders being knocked over on the floor, and is easy to clean and keep in service. The present invention is designed as an accessory for x-frame type ambulance cots and installs on an existing cot without modification. The carrier provides optimal positioning of the cylinder while transporting the patient and does not interfere with raising and lowering the cot.

In one embodiment of the present invention, a carrier for an oxygen bottle, which mounts within the lateral boundaries of an ambulance cot having two pairs of support legs, is disclosed. The carrier comprises a base plate configured to engage a first of the pairs of support legs, and a collar defining a space, the collar is configured to engage a second of the pairs of support legs. A plurality of elongated columns is mounted between the base plate and collar. A height adjustable cup is slidable mounted to the columns and is configured to engage a bottom of the oxygen bottle, wherein the oxygen bottle is carried substantially within boundaries of the carrier defined by the space, the columns, and the cup.

In another embodiment, a carrier for an oxygen bottle, which mounts within the lateral boundaries of an ambulance cot having two pairs of support legs, is disclosed. The carrier comprises a base plate having a pair of yoke portions configured to engage a first of the pairs of support legs, and a collar defining a space and having a securing device configured to engage the oxygen bottle. The collar is configured to engage a second of the pairs of support legs. A plurality of elongated columns is mounted between the base plate and the collar. A height adjustable cup is slidable mounted to the columns and is configured to engage a bottom of the oxygen bottle. An over-yoke assembly with at least one securing device is configured to releasably engage a neck of the oxygen bottle. The oxygen bottle is carried substantially within boundaries of the carrier defined by the space, the columns, and the cup. The carrier is capable of holding with the boundaries a bottle having a base diameter of 4.38 inches and a length up to and including 24.9 inches.

Further benefits and advantages of the invention will become apparent from a consideration of the following detailed description, given with reference to the accompanying drawings, which specify and show preferred embodiments of the invention.

Figure 1:
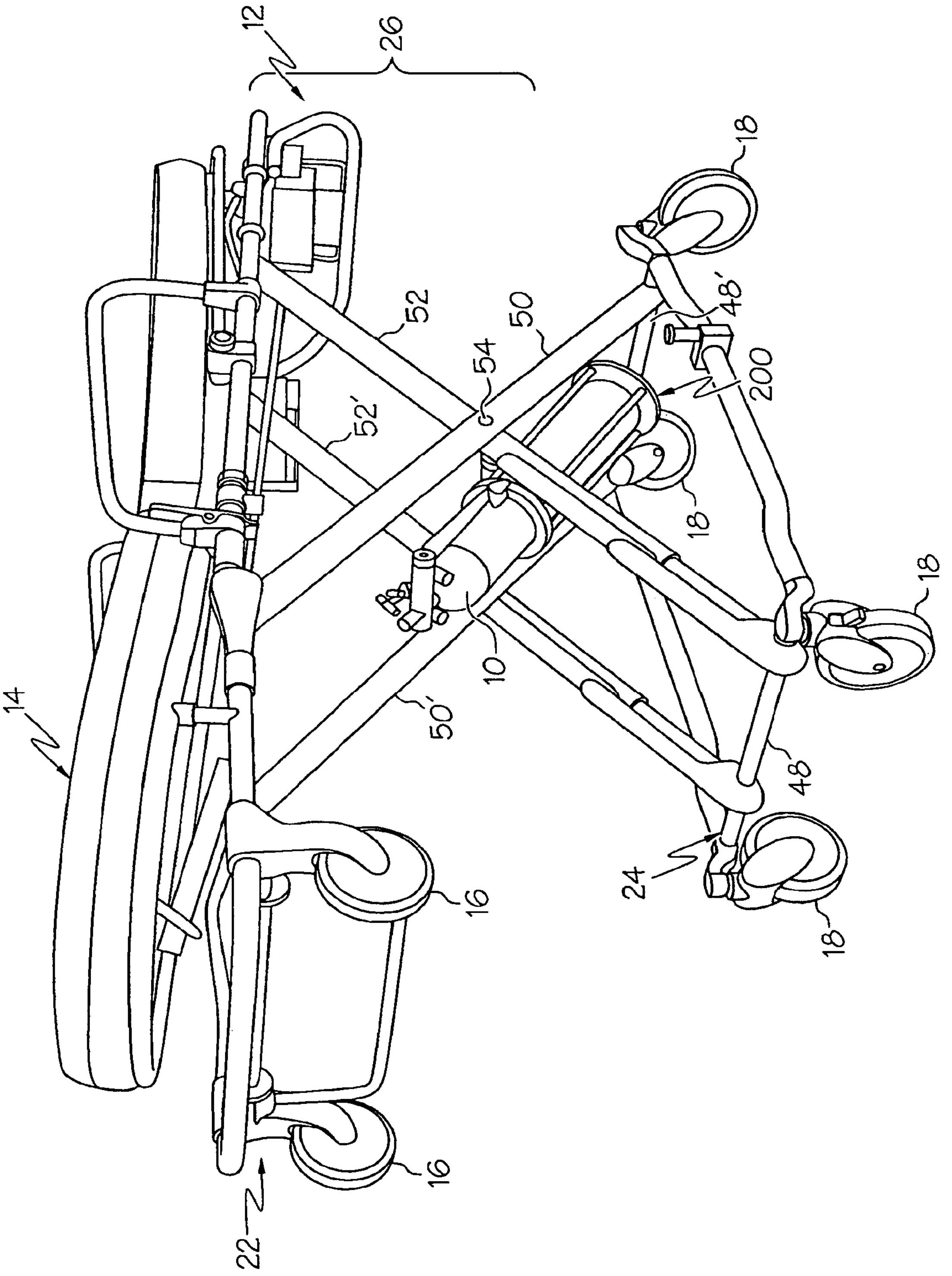
FIG. 1 is a perspective view showing a conventional ambulance cot with the present invention mounted thereon and holding an oxygen bottle.

Referring now to the drawings in detail wherein like reference characters indicate like parts throughout the several figures. The reference number 200 indicates generally the oxygen bottle carrier constructed in accordance with the invention, carrying a conventional oxygen bottle 10 and mounted to a retractable x-frame ambulance cot 12. The ambulance cot 12 as utilized herein is of the type manufactured by Ferno-Washington, Inc., Wilmington, Ohio, and is intended only as a representative sample.

With reference to FIG. 1, a patient may be supported upon a support surface 14 of the cot 12, and conveniently loaded onto an elevated surface, such as for example, the transport bay of an ambulance, using loading wheels 16. The cot 2 is moved either along a surface in the fully elevated position as illustrated, using swivel wheels 18, or in a fully lowered position. It is to be appreciated that in the fully lowered position, loading wheels 16 and swivel wheels 18 rollable support the cot 2 upon the surface.

The cot 2 comprises an upper frame 22, a lower frame 24, and a support mechanism shown generally as 26 disposed therebetween for supporting and moving the upper frame 22 relative to the lower frame 24. The upper frame 22 is generally rectangular, and in the illustrated embodiment shown by FIG. 3, comprises at a loading end 28, a leading end frame member 30 coupled rotatably to a pair of opposed, longitudinally extending side frame members 32, 32'. At a trailing end 34, the side frame members 20 and 20' are coupled to a trailing end frame member 36, having a bent U-shape handle bar frame member 38. The frame members 30, 32, 32', 36, and 38 are a tubular material, such as metal, laminate, plastics, or combinations thereof.

In the illustrated embodiment, the leading end frame member 30 is coupled rotatably to the opposed side frame members 20, 20' and is a drop frame, such as the type disclosed by U.S. Pat. No. 6,701,545, a patent commonly assigned to Ferno Washington, Inc., and the disclosure of which is herein fully incorporated by reference. The loading wheels 16 are provided to the leading end frame member 30.

The upper frame 22 includes the patient support 14. The patient support 14 includes back and leg rests 40 and 42, respectively, which may be positioned in a number of raised positions. The upper frame 22 further includes a pair of sidearm supports 44, 44' which are each rotatably mounted to respective side frame members 32, 32'. It is to be appreciated that the pair of sidearm supports 44, 44' rotate about an axis, which is the central axis of each side frame members 32, 32'. Each sidearm support 32, 32' can rotate about 180 degrees from a vertically up position to a nearly vertically down position, or to an outwardly extended position.

In another embodiment, the upper frame 22 is a support platform for releasably receiving a multipurpose roll-in cot shown. In such an embodiment, mounting engagements would be provided instead of the patent support 14 to support a multipurpose roll-in cot such as, for example, the types disclosed by U.S. Pat. No. 4,037,871, and PCT Application No. US01/45144 (WO0239944), references commonly assigned to Ferno Washington, Inc., the disclosures of which are herein fully incorporated by reference.

The lower frame 24 is generally rectangular, and has a set of the swivel wheels 18 at each corner thereof. The wheels 18 may be conventional caster wheels with foot-operated locking mechanisms. The lower frame 24 comprises a pair of longitudinally extending side frame members 46, 46' separated by lower transverse frame members 48, 48' provided at the loading end 28 and the trailing end, respectively.

Figure 2:
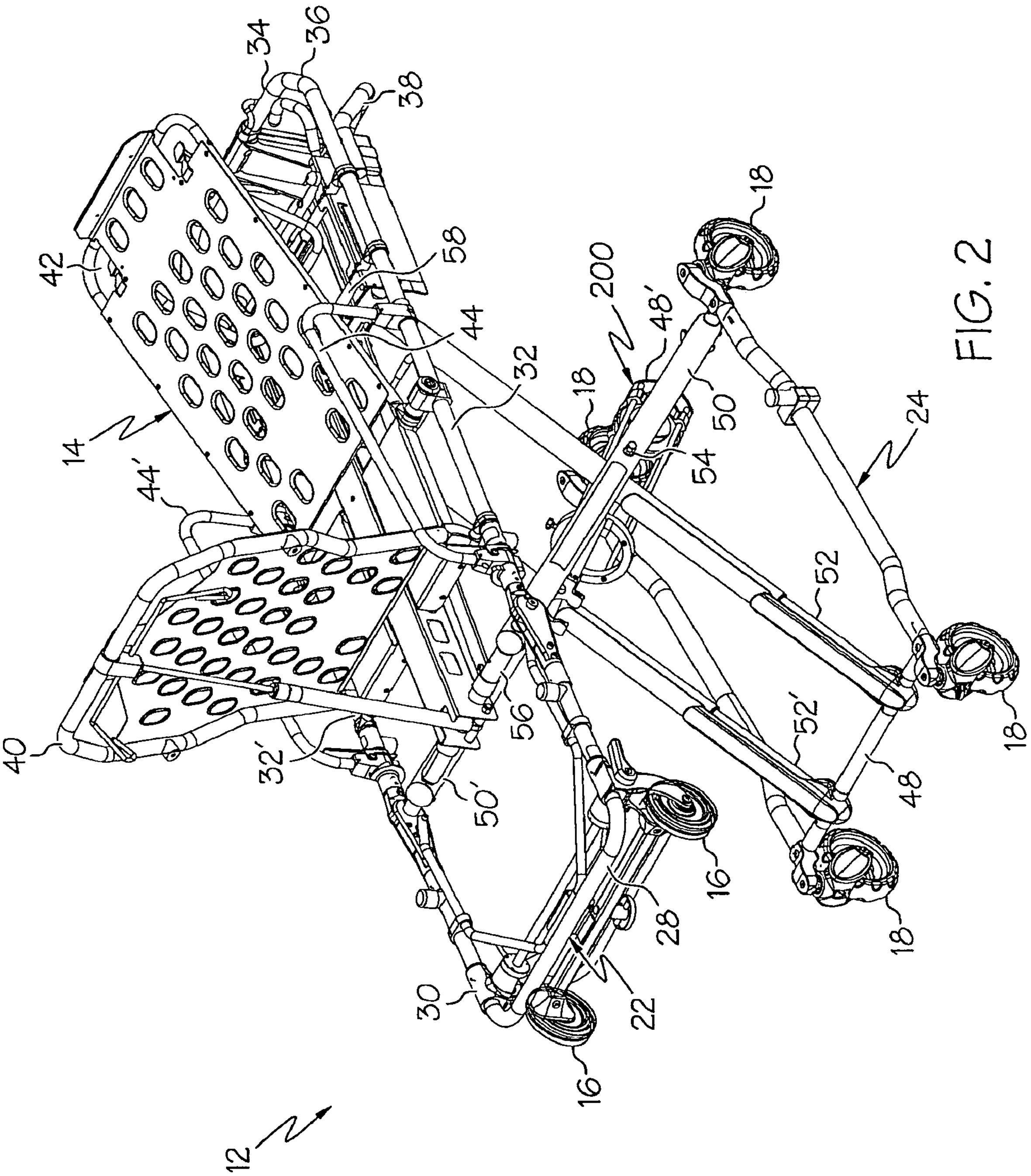
FIG. 2 is a perspective view showing a conventional ambulance cot with the present invention mounted thereon without an oxygen bottle held therein.

The support mechanism 26 is an x-frame that includes a first pair of parallel legs 50, 50' and a second pair of parallel legs 52, 52', which define the lateral boundaries of the cot 10. Respective ones of the pairs of parallel legs 50, 52 and 50', 52' are pivotably connected together at an intermediate location by a respective pivot connection 54, 54'. The upper ends of the first pair of legs 50, 50' are pivotably connected to an upper traverse frame member 56 of the upper frame 22, which is best shown in FIG. 2. The lower ends of the first pair of legs 50, 50' are pivotably connected to the lower trailing transverse frame member 48'. The lower ends of the second pair of legs 52; 52' are pivotably connected to the lower leading transverse frame member 48 of the lower support frame 14. The upper ends of the second pair of legs 52, 52' are pivotably connected to upper frame 12 by a releasable member 58. The releasable member 58, when released by an actuator, permits the upper ends of the second pair of legs 52, 52' to pivot and transition longitudinally such that the upper frame 22 may be position vertically relative to the lower frame 24 in the fully lowered, fully extended, or a plurality of positions therebetween.

Figure 3:
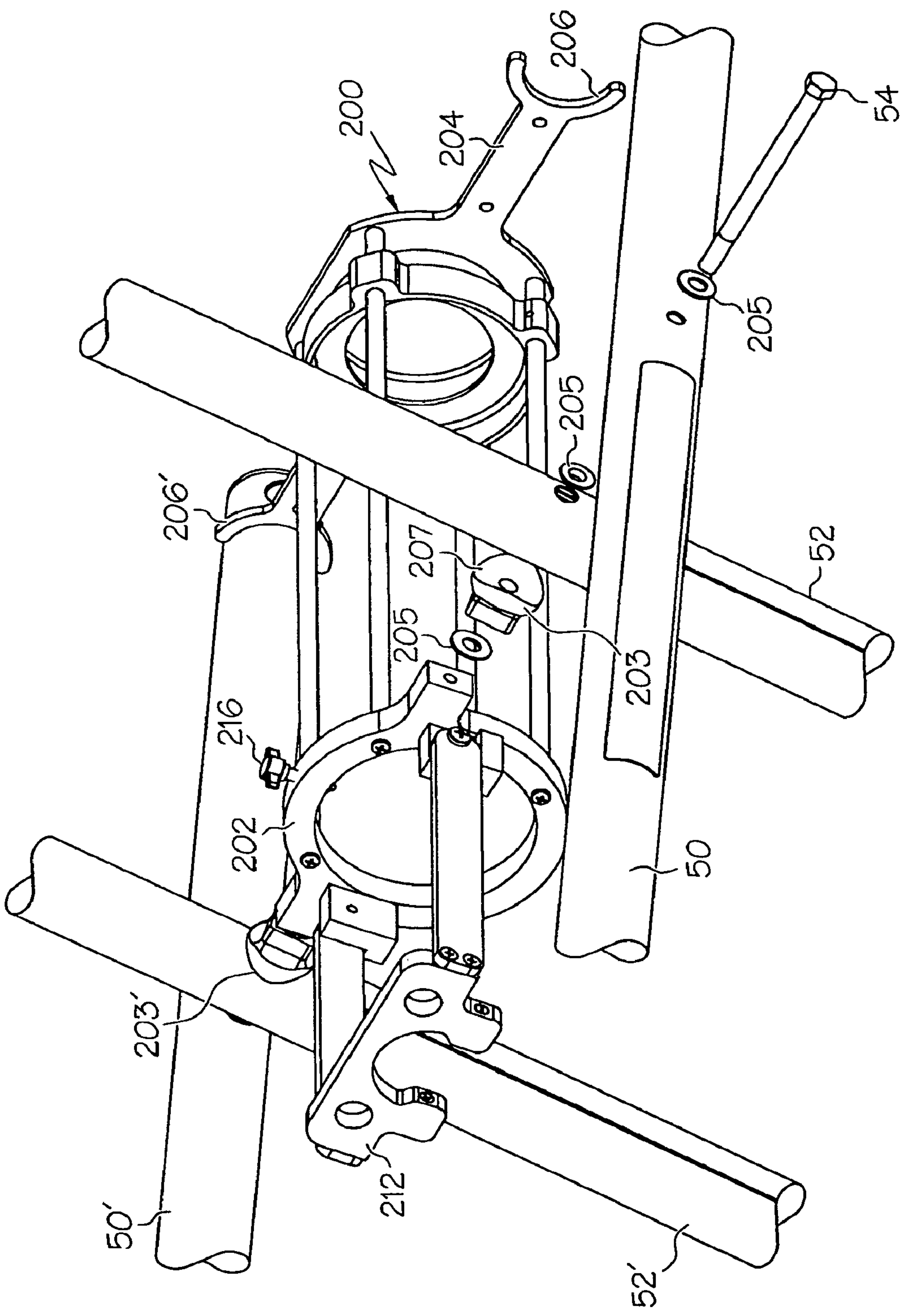
FIG. 3 is a side close-up view of the present invention showing one of the pivot connects removed from the ambulance cot.
Figure 4:
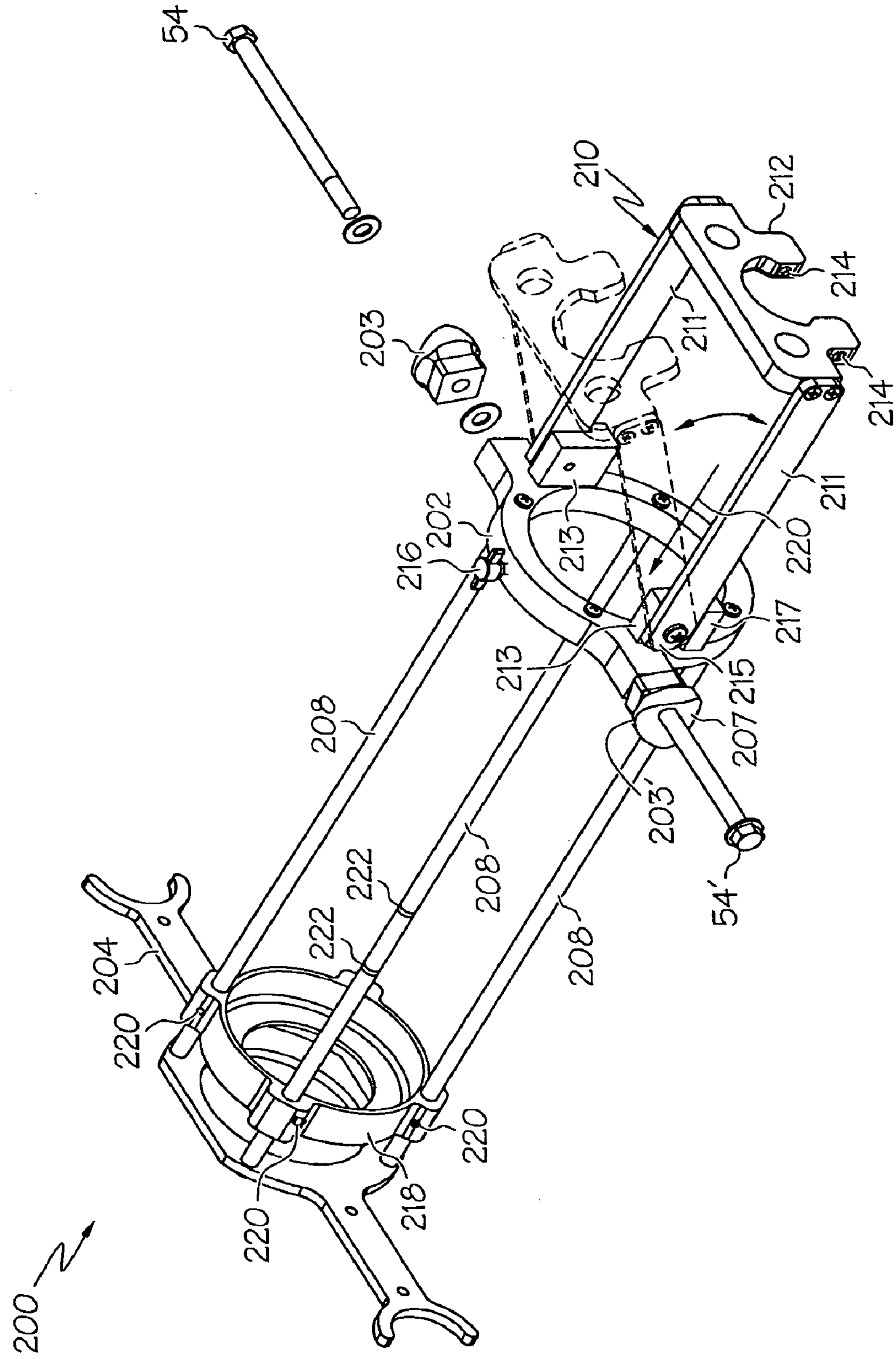
FIG. 4 is a perspective view of the present invention.

Situated between the pairs of parallel legs 50, 52 and 50', 52' is the oxygen bottle carrier 200 according to the present invention. The carrier 200 may formed of a material, such as metal, laminates, polymers, or combinations thereof. As best shown in FIG. 3, the oxygen bottle carrier 200 incorporates a series of elements the first of which are collar 202 and base plate 204. The collar 202 is mounted between the second pair of legs 52, 52' via respective pivot connections or bolts 54, 54' (FIG. 4). The bolts 54, 54' extend through the respective ones of the pairs of parallel legs 50, 52 and 50', 52' to pivotably connect the legs together at the intermediate location and to secure the collar 202 to the cot 12. The bolts 54, 54' also pass through respective center plugs 203, 203' and a number of washers 205, which help pivoting between respective legs and reduce wear between the leg and carrier connections. Each of the center plug 203, 203' provides a concave surface portion 207, such that the collar 202 mates closely to the surface of the second pair of legs 52, 52'.

At the lower end, the base plate 204 is held between the first pair of legs 50, 50' by a pair of yoke portions 206, 206' that span therebetween. The yoke portions 206, 206' of the base plate 204 are sized and shaped for a firm yet removable engagement, and straddle the first pairs of legs to fix the lower end of the carrier 200 to the cot 12. As is apparent, the carrier 200 is centrally located and thus the load from the oxygen bottle 10 is centrally located on the cot 2 below the patient support 14 and distributed along the major horizontally extending axis of the lower support 24, as shown in FIG. 1, to avoid cantilevered loads.

With reference to FIG. 4, the other elements of the carrier 200 include a plurality of column members 208 which separate and join the collar 202 to the base plate 204. Situated adjacently above and mounted to the collar 204 is an over-yoke assembly 210. The over-yoke assembly 210 includes a pair of braces 211 supporting an over-yoke portion 212. The pair of braces 211 is also pivotably mounted to a pair of brackets 213 provided by the collar 202, such that the over-yoke portion 212 may rotate upwards, as illustrated by the shadow lines in FIG. 4, such that a conventional oxygen bottle 10 may be conventionally situated in/removed from the carrier 200. It is to be appreciated that first ends 215 of the pair of braces 211 are beveled such that the rotation of the over-yoke assembly 210 about the brackets 213 is limited to prevent the over-yoke assembly from raising to vertical. The rotation of the over-yoke assembly 210 is limited by each of the beveled first ends 215 abutting against a respective abutting surface or lip 217 of the brackets 213. Limiting the range of motion of the over-yoke assembly 210 prevents jamming when lowering the cot in the event that the operator failed to lower the over-yoke assembly after raising it to place or remove an oxygen bottle 10 (FIG. 5) from the carrier 200. In this manner, due to limiting the maximum raised angle, the over-yoke assembly 210 will be lowered as the cot is also lowered, thereby avoiding a jam.

The over-yoke portion 212 is sized and shaped to fit around a major portion of the neck 205 of the conventional oxygen bottle 10. Over-yoke securing devices 214, such as setscrews extending through the over-yoke portion 212, are provided to releasably engage the neck 205 of the bottle 10. A collar-securing device 216 is also provided to releasably engage the bottle, such that the oxygen bottle 10 does not rotate when held in the carrier 200. In the illustrated embodiment, the collar-securing device 216 is a thumbscrew, which has a threaded screw that cooperates with a tapped hole (not shown) located in any convenient location along the collar 202. In the embodiment shown the tapped hole is located at an upper portion of the collar 202. As is apparent, other types of securing devices other than set screws 214 and thumb screw 216, such as clips, straps, and the like may be used.

Figure 5:
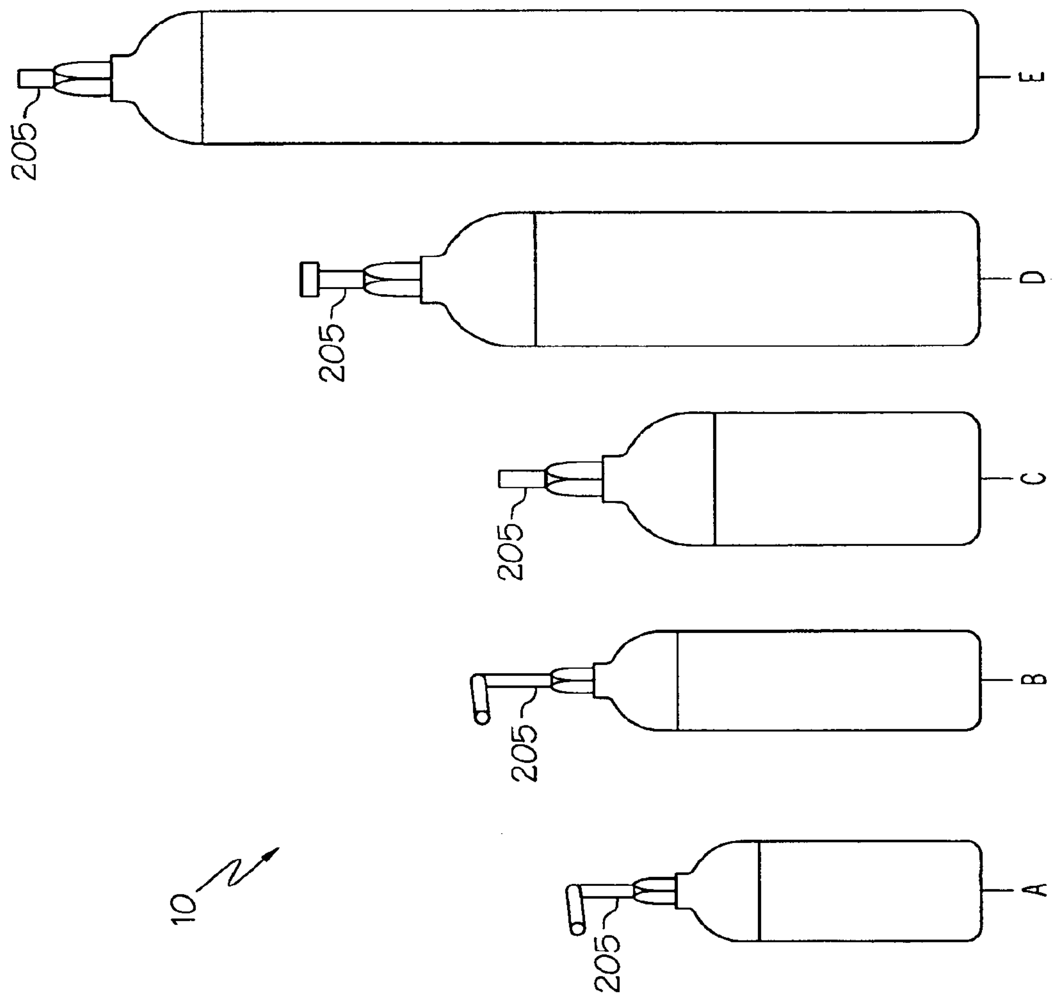
FIG. 5 (PRIOR ART)
FIG. 5 illustrates conventional bottle sizes for medical use to store compressed oxygen.

The oxygen bottle carrier 200 further includes a cup 218 which mates closely with the bottom of the oxygen bottle 10 (FIG. 5). The cup 218 is adjustable slidably along the columns to accommodate bottles of varies lengths. The cup 218 is securable at a location along the columns 208 via setscrews 220 or any other suitable adjustable securing means. It is to be appreciated that the surfaces of the collar 202, over-yoke assembly 210, and cup 218 which come into connect with the oxygen bottle 10 may be provided with a rubber mat or lining to prevent metal to metal contact as well as slippage of the oxygen bottle itself.

Substantially within the boundaries of the oxygen bottle carrier 200, defined by the space between the collar 202, the columns 208, and cup 218, a conventional oxygen bottle with the conventional gauges, regulators, valving connected to the neck of the bottle, can be mounted. Table 1 identifies the dimensions of the typically oxygen bottle used for medical applications, which are shown by FIG. 5.

TABLE 1

Aluminum Cylinder Specifications*

| Name | Diameter (in.) | Height (in.) | Capacity (liters) | Weight (lb.)** |
|---|---|---|---|---|
| M-2 | 3.21 | 5.37 | 34 | 0.7 |
| A or M-4 | 3.21 | 8.4 | 113 | 1.6 |
| B or M-6 | 3.21 | 11.6 | 164 | 2.2 |
| ML-6 | 4.38 | 7.68 | 165 | 2.8 |
| M-7 | 4.38 | 9.18 | 198 | 3.3 |
| C or M-9 | 4.38 | 10.7 | 255 | 3.7 |
| D or M-15 | 4.38 | 16.5 | 425 | 5.3 |
| E or M-24 | 4.38 | 24.9 | 680 | 7.9 |

*Specifications vary slightly among manufacturers

**Empty weight--without valve or oxygen

Two sets of names are used to specify cylinder sizes. The older set identifies them alphabetically from A, the smallest, to E, the largest. Typically, the lightweight B cylinder and the E cylinder are primarily pulled along in a separate cart. Each of the newer set of names starts with the letter M to denote "medical," followed by a number, which specifies the amount of oxygen in cubic feet that can been compressed into the cylinder. For example, the B cylinder is also called the M-6 cylinder. The space 220 of the collar 202 is sized to accommodate a bottle having a base diameter of 4.38 inches. Accordingly, the carrier 200, because of its adjustable cup 218, is capable of holding the last five cylinders in Table 1.

In operation, an E sized bottle is accommodated with the carrier 200 with the cup 218 positioned against the base plate 204, such as is illustrated by FIG. 1. If a smaller bottle is to be held, the cup 218 is adjusted along the columns to provide the proper seating engagement with the bottom of the bottle 10. It is to be appreciated that markings 222 may be provided along at least one of the columns to indicate the proper positioning of cup 218 for a given bottle size. As so arranged, the bottle is then placed within the carrier, and the set screws 214 and thumb screw 216 can be tightened to secure the bottle in place. It is to be appreciated that the carrier 200 has been tested to AMD 003, wherein the carrier is capable of securing a cylinder for crash loads in all directions up to 25 Gs.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the amended claim.

The invention claimed is:

1. A carrier for an oxygen bottle which mounts within the lateral boundaries of an ambulance cot, said ambulance cot having a patient support and two pairs of support legs, said carrier comprising:

a base plate configured to engage a first of the pairs of support legs;

a collar defining a space, said collar is configured to engage a second of the pairs of support legs;

a plurality of elongated columns mounted between said base plate and collar; and a height adjustable cup slidable mounted to said columns and configured to engage a bottom of the oxygen bottle, wherein the oxygen bottle is carried substantially within boundaries of the carrier defined by the space, the columns, and the cup.

2. The carrier of claim 1, wherein the collar mounts between the second of the pairs of support legs via pivot connections.

3. The carrier of claim 1, wherein the collar mounts to the cot via a pair of bolts which extend through respective ones of the pairs of support legs to pivotably connect the support legs together at an intermediate location.

4. The carrier of claim 1, wherein the collar further includes center plugs and mounts to the cot via bolts which extend through respective ones of said center plugs and respective ones of the pairs of support legs to pivotably connect the support legs and said center plugs together at an intermediate location.

5. The carrier of claim 1, wherein the collar further includes a pair of center plugs which each provide a concave surface portion.

6. The carrier of claim 1, wherein said base plate has a pair of yoke portions.

7. The carrier of claim 1, wherein said base plate has a pair of yoke portions which are configured to span between the first of said pairs of support legs, and are sized and shaped for a firm yet removable engagement with the first of the pairs of support legs.

8. The carrier of claim 1 wherein the carrier mounts centrally on the cot below the patient support.

9. The carrier of claim 1, further comprising an over-yoke assembly.

10. The carrier of claim 1, further comprising an over-yoke assembly that is sized and shaped to fit around a major portion of a neck of the oxygen bottle.

11. The carrier of claim 1, wherein the collar further comprises an over-yoke assembly with at least one securing device configured to releasably engage a neck of the oxygen bottle.

12. The carrier of claim 1, further comprising an over-yoke assembly with at least one securing device configured to releasably engage a neck of the oxygen bottle, said at least one securing device being a pair of set screws.

13. The carrier of claim 1, further comprising a collar securing device which is configured to releasably engage the oxygen bottle such that the oxygen bottle does not rotate when held in said carrier.

14. The carrier of claim 1, further comprising a collar securing device which is configured to releasably engage the oxygen bottle such that the oxygen bottle does not rotate when held in said carrier, said collar securing device being a thumb screw.

15. The carrier of claim 1, wherein said cup is sized to accommodate a bottle having a base diameter of 4.38 inches.

16. The carrier of claim 1, wherein said collar is sized to accommodate through said space a bottle having a base diameter of 4.38 inches.

17. The carrier of claim 1, wherein said elongated columns are sized and said cup is height adjustable to accommodate a bottle having a length up to and including 24.9 inches.

18. The carrier of claim 1, wherein the carrier is capable of holding with the boundaries a bottle having a base diameter of 4.38 inches and a length up to and including 24.9 inches.

19. A carrier for an oxygen bottle which mounts within the lateral boundaries of an ambulance cot, said ambulance cot having two pairs of support legs, said carrier comprising:

a base plate having a pair of yoke portions configured to releasably engage a first of the pairs of support legs;

a collar defining a space and having a securing device configured to engage the oxygen bottle, said collar is configured to engage a second of the pairs of support legs;

a plurality of elongated columns mounted between said base plate and said collar;

a height adjustable cup slidable mounted to said columns and configured to engage a bottom of the oxygen bottle; and an over-yoke assembly with at least one securing device configured to releasably engage a neck of the oxygen bottle, wherein the oxygen bottle is carried substantially within boundaries of the carrier defined by the space, the columns, and the cup, and wherein the carrier is capable of holding with the boundaries a bottle having a base diameter of 4.38 inches and a length up to and including 24.9 inches.

20. A method of carrying an oxygen bottle on an ambulance cot having two pairs of support legs, said method comprising:

mounting within lateral boundaries of the ambulance cot a carrier according to claim 1; and placing the oxygen bottle in said carrier.

* * * * *

UNITED STATES PATENT AND TRADEMARK OFFICE

CERTIFICATE OF CORRECTION

PATENT NO. : 8,100,307 B2
APPLICATION NO. : 12/293584
DATED : January 24, 2012
INVENTOR(S) : Bob Chinn et al.

It is certified that error appears in the above-identified patent and that said Letters Patent is hereby corrected as shown below:

Title Page: Item 63
Add Related U.S. Application Data to claim benefit to U.S. Provisional Application Serial No. 60/784,008 filed March 20, 2006.

Signed and Sealed this
Thirty-first Day of July, 2012

David J. Kappos
*Director of the United States Patent and Trademark Office*